US008740605B2

(12) United States Patent
Kim

(10) Patent No.: US 8,740,605 B2
(45) Date of Patent: Jun. 3, 2014

(54) SPRING TUBE MELTING MACHINE FOR AIR SUSPENSION SYSTEM

(75) Inventor: Jong hun Kim, Daegu (KR)

(73) Assignee: Sunjin Precision Co., Ltd., Daegu (KR)

( * ) Notice: Subject to any disclaimer, the term of this patent is extended or adjusted under 35 U.S.C. 154(b) by 120 days.

(21) Appl. No.: 13/520,097

(22) PCT Filed: Dec. 29, 2010

(86) PCT No.: PCT/KR2010/009526
§ 371 (c)(1),
(2), (4) Date: Jun. 29, 2012

(87) PCT Pub. No.: WO2011/081462
PCT Pub. Date: Jul. 7, 2011

(65) Prior Publication Data
US 2012/0276241 A1    Nov. 1, 2012

(30) Foreign Application Priority Data

Dec. 30, 2009  (KR) .................. 10-2009-0133928

(51) Int. Cl.
*B29C 49/44*    (2006.01)
(52) U.S. Cl.
USPC ........... 425/389; 425/392; 425/522; 425/526; 425/535
(58) Field of Classification Search
CPC ............... B29C 49/0073; B29C 49/44; B29L 2031/703; B29L 2031/721; B29L 2031/774

USPC .......... 425/389, 392, 522, 526, 535; 264/509, 264/523, 573
See application file for complete search history.

(56) References Cited

U.S. PATENT DOCUMENTS

| 750,118 | A | * | 1/1904 | Petit .............................. 425/522 |
| 3,057,768 | A | * | 10/1962 | McGough ..................... 156/202 |
| 4,749,345 | A | * | 6/1988 | Warmuth et al. ............. 425/535 |
| 5,192,057 | A | * | 3/1993 | Wydra et al. .................. 267/122 |
| 2003/0075832 | A1 | * | 4/2003 | Gnirk et al. ................... 425/525 |
| 2006/0021707 | A1 | * | 2/2006 | Bederna et al. ............... 156/382 |

FOREIGN PATENT DOCUMENTS

| DE | 10302884 A1 * 10/2006 |
| EP | 1859913 A1 * 11/2007 |
| EP | 2058113 A2 * 5/2009 |

* cited by examiner

*Primary Examiner* — Robert B Davis
(74) *Attorney, Agent, or Firm* — Novick, Kim & Lee; Jae Youn Kim

(57) ABSTRACT

Disclosed therein is a spring tube melting machine of an air suspension system. The spring tube melting machine includes an inner molding part (100) and an outer molding part (200), which can mold an integrated spring tube by compressing half-finished spring tube materials at high temperature in order prevent bad molding due to the remaining air and overlap of spring tube materials and simplify maintenance due to repeated use.

4 Claims, 3 Drawing Sheets

SPRING TUBE MELTING MACHINE FOR AIR SUSPENSION SYSTEM

TECHNICAL FIELD

The present invention relates to a spring tube melting machine for an air suspension system, and more particularly, to a spring tube melting machine for an air suspension system, which can form an air spring tube by melting tube materials stacked up in multiple layers at high temperature.

BACKGROUND ART

In general, an air suspension system serves to reduce a damage of a car body and provide a comfortable ride to a passenger by connecting a car axle and the car body with each other by pneumatic pressure to thereby properly reduce vibration or shock transferred from the surface of the road during drive, so as to adjust a buffer power according to drive conditions and provide smoother feeling of drive by adjusting pneumatic pressure.

Moreover, the air suspension system includes a spring tube mounted between a lower housing fixed to the car axle and an upper housing fixed to the car body. The spring tube performs a buffering action when compressed air is injected into the spring tube, and is formed in such a fashion that tube materials, which are stacked up in multiple layers, are inserted into a melting machine and are melted integrally.

U.S. Pat. No. 3,057,768 discloses a method of molding an air spring that an unhardened sleeve is outwardly pressed relative to an outer static mold by an inwardly expandable mandrill.

In U.S. Pat. Nos. 3,964,846 and 5,468,140, an air spring is cured by pressure of a mandrill acting from the outside to the inside, namely, toward the outer circumferential surface of a cartridge.

The spring tube melting machines according to the prior arts are manufactured with the purpose of easily manufacturing spring tubes, but have many problems in use.

First, when the mandrill presses the air spring while performing expansion and contraction, the surface of the air spring is formed unevenly because remaining air between the mandrill and the air spring cannot be discharged rapidly.

Second, when the mandrill which is used as consumable goods is replaced with a new one, there is an inconvenience to completely disassemble the spring tube melting machine.

Third, in order to form pyramid-shaped relief engraving portions on the air spring, because intaglio engraving portions, which is difficult to do cutting work, must be formed on the surface of the cartridge, it requires expensive prices to manufacture the cartridge.

DISCLOSURE

Technical Problem

Accordingly, the present invention has been made in an effort to solve the above-mentioned problems occurring in the prior arts, and it is an object of the present invention to provide a spring tube melting machine for an air suspension system, which can prevent poor molding due to the remaining air and overlap of spring tube materials during a high-temperature compression molding and is easy in maintenance even though it is used repeatedly.

Technical Solution

To achieve the above objects, the present invention provides a spring tube melting machine for an air suspension system including: an inner molding part having an upper plate, which has an air injection nozzle and a plurality of joining keys formed on the outer circumferential surface of the upper plate, a finish plate detachably mounted and having an end fixed to the lower surface of the upper plate in such a way as to communicate with the air injection nozzle and having a reference projection formed at the other end thereof so that both ends of the finish plate are sealed and fixed, and an expandable tube inserted into a half-finished spring tube; and an outer molding part having a heating core, which is heated by a heat source while the expandable tube of the inner molding part is accommodated and has a reference recess corresponding and interlocking with the reference projection, and a joining key recess formed at an entrance of the heating core in the form of "∟" shape in correspondence with the joining key.

In this instance, the expandable tube has a relief engraving portion formed on the outer circumferential surface thereof, and the spring tube has an intaglio engraving portion formed on the inner circumferential surface during molding, and hence, when the spring tube is turned inside out after completion of molding, the spring tube has the engraving portion formed on the outer circumferential surface.

Moreover, the expandable tube has a sectional thickness, which is gradually reduced from both edge portions to the central portion so as to have an arch-curved surface on the inner circumferential surface Furthermore, the heating core includes an air discharge valley formed on the inner circumferential surface in a longitudinal direction of the spring tube.

Advantageous Effects

As described above, in the spring tube melting machine for the air suspension system according to the present invention, air remaining between the spring tube and the heating core is rapidly discharged out along the air discharge valleys because the expandable tube presses the spring tube while being gradually expanded from the central portion to both edge portions. Moreover, because pressure force is applied from the inside to the outside by the expansion force of the expandable tube, the spring tube melting machine can prevent bad molding due to overlap of the spring tubes, and especially, the expandable tube can be easily replaced during use because it is detachably mounted by the finish plate.

Furthermore, after the relief engraving portion is formed on the inner circumferential surface of the spring tube using the intaglio engraving portion formed on the expandable tube, when the spring tube is turned inside out, the relief engraving portion is formed on the outer circumferential surface of the spring tube, and hence, the relief engraving portion can be easily formed on the surface of the spring tube.

MODE FOR INVENTION

Reference will be now made in detail to the preferred embodiment of the present invention with reference to the attached drawings.

Figure 1:
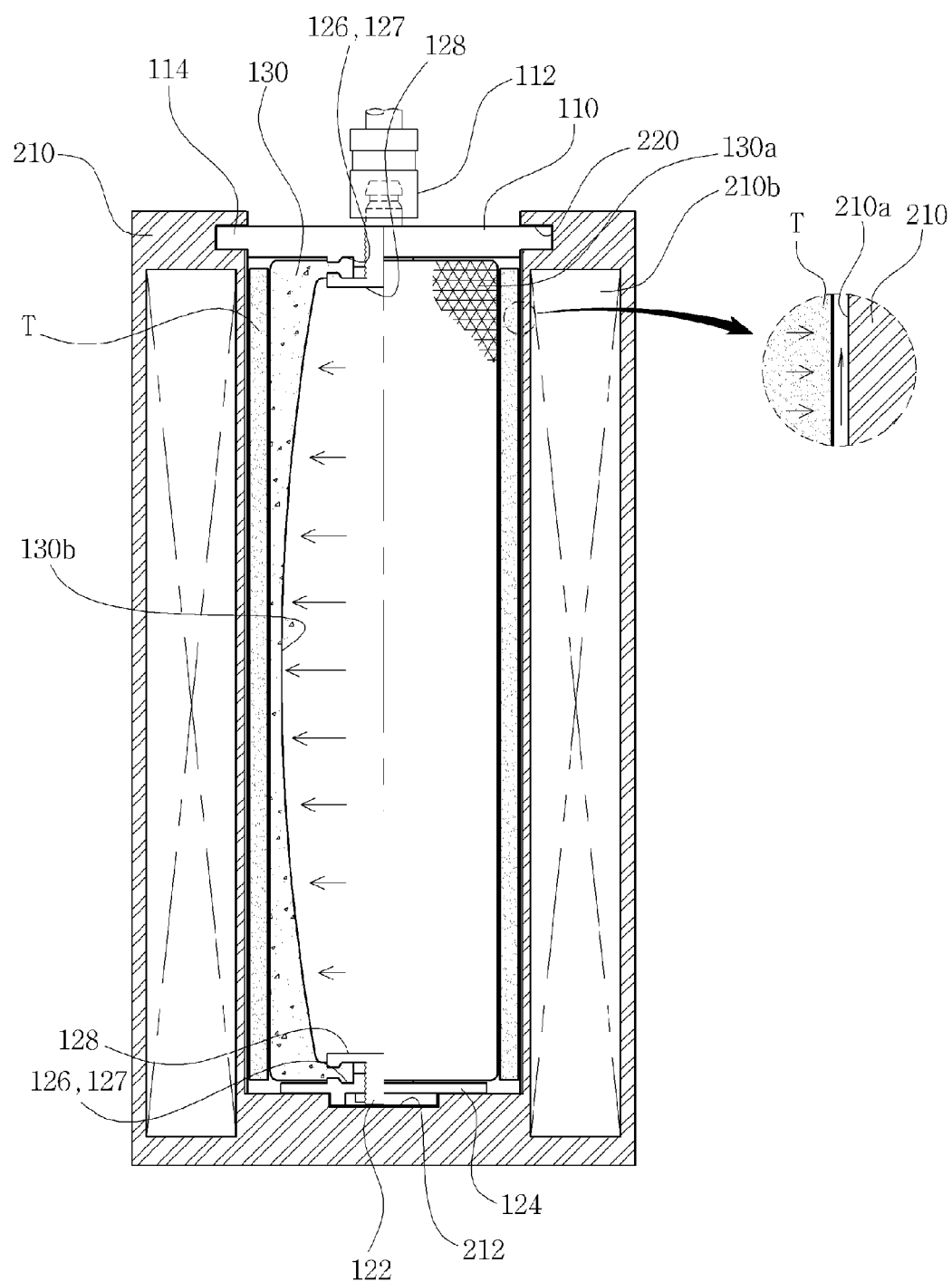
FIG. 1 is a configurative view showing a spring tube melting machine for an air suspension system according to the present invention.
Figure 2:
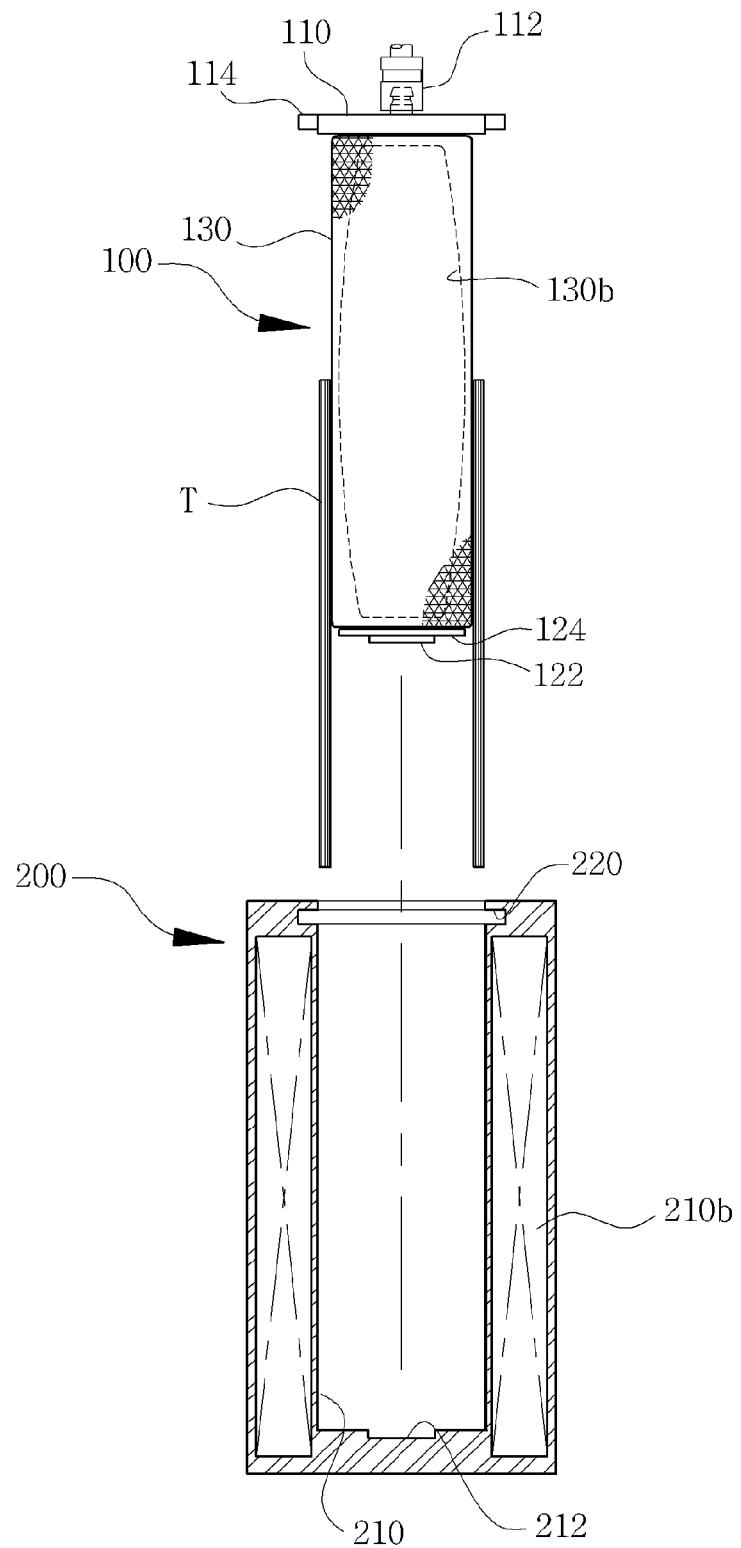
FIG. 2 is a configurative view showing an inner molding part and an outer molding part of the spring tube melting machine for the air suspension system.
Figure 3:
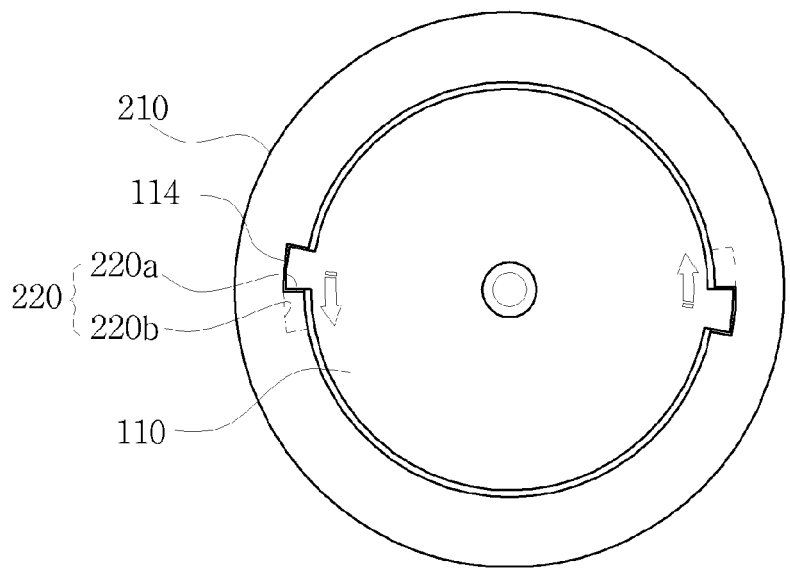
FIG. 3 is a configurative view showing a joining key and a joining key recess of the spring tube melting machine for the air suspension system.
Figure 4:
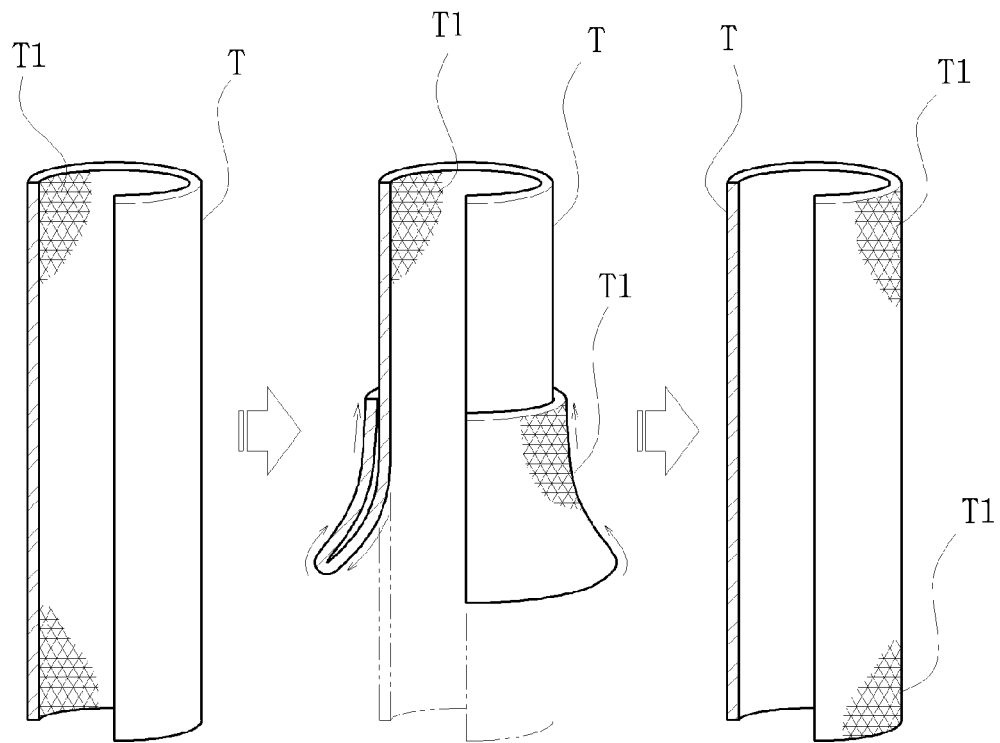
FIG. 4 is a configurative view showing a state where the spring tube formed through the spring tube melting machine for the air suspension system is turned inside out.

FIG. 1 is a configurative view showing a spring tube melting machine for an air suspension system according to the present invention, FIG. 2 is a configurative view showing an inner molding part and an outer molding part of the spring tube melting machine for the air suspension system, FIG. 3 is a configurative view showing a joining key and a joining key recess of the spring tube melting machine for the air suspension system, and FIG. 4 is a configurative view showing a state where the spring tube formed through the spring tube melting machine for the air suspension system is turned inside out.

The present invention relates to a spring tube melting machine for an air suspension system, and the spring tube melting machine for the air suspension system forms an integrated spring tube by compressing half-finished spring tubes at high temperature. In this instance, in order to prevent poor molding due to the remaining air and overlap of spring tube materials and make maintenance of the spring tube easy even though it is used repeatedly, the spring tube melting machine includes an inner molding part 100 and an outer molding part 200.

The inner molding part 100 includes: an upper plate 110, which has an air injection nozzle 112 and a plurality of joining keys 114 formed on the outer circumferential surface of the upper plate 110; a finish plate 124 detachably mounted and having an end fixed to the lower surface of the upper plate 110 in such a way as to communicate with the air injection nozzle 112 and having a reference projection 122 formed at the other end thereof, so that both ends of the finish plate 124 are sealed and fixed; and an expandable tube 130 inserted into a half-finished spring tube T. The inner molding part 100 is joined with the outer molding part 200, which will be described later, and serves to pressurize the spring tube T from the inside to the outside by an expansion force of the expandable tube 130.

Here, the upper plate 110 of the inner molding part 100 is a cover to open and close an entrance of a heating core 210, which will be described later, is formed in a circular plate shape, and has at least two joining keys 114 protrudingly formed at edge portions thereof at equal angle positions so as to be locked to or released from joining key recesses 220, which will be described later. Furthermore, the air injection nozzle 112 is communicatingly disposed into the expandable tube on the upper face of the upper plate 110 and is connected with a compressor to thereby supply compressed air into the expandable tube 130 during a compression molding process.

Additionally, the expandable tube 130 includes circular projections 126 formed at both end portions thereof, and the upper plate 110 and the finish plate 124 respectively have concave grooves 127 formed at positions corresponding to the projections 126, so that the projections 126 and the concave grooves 127 interlock each other. In this instance, the concave grooves 127 are formed on actuation plates 128, which are regulated in interval by screw-coupling, and are detachably joined with an end portion of the expandable tube 130 having the circular projections 126, which correspond to the concave grooves 127 of the actuation plate 128 and are opposed to each other on the upper plate 110 and the finish plate 124.

In addition, the finish plate 124 includes a reference projection 122 protrudingly formed at a position corresponding to a reference recess 212 of a heating core 210, which will be described later, and hence, when the upper plate 110 is assembled, the reference projection 122 and the reference recess 212 interlock each other to thereby locate the expandable tube 130 and the heating core 210 on the same axis.

Moreover, both ends of the expandable tube 130 are sealed by the upper plate 110 and the finish plate 124, and the expandable tube 130 presses the half-finished spring tube T from the inside to the outside while being expanded in stable in vertical and horizontal directions when compressed air is injected. In this instance, the expandable tube 130 has a sectional thickness, which is gradually reduced from both edge portions to the central portion so as to have an arch-curved surface 130b on the inner circumferential surface.

So, when compressed air is injected into the expandable tube 130 through the nozzle 112, the thin central portion is first expanded, and then, the edge portions are expanded, and hence, the remaining air between the expandable tube 130, which gets in contact with the inner or outer circumferential surface of the spring tube T, and the heating core 210 is gradually pushed from the central portion to the edge portions to be removed cleanly, whereby the spring tube T is prevented from bad molding due to the remaining air.

Furthermore, because the expandable tube 130 has a relief engraving portion 130a formed on the outer circumferential surface thereof, a intaglio engraving portion T1 is formed on the inner circumferential surface of the spring tube T, and then, after the molding, as shown in FIG. 4, the spring tube T is turned inside out so that the engraving portion T1 is formed on the outer circumferential surface. As an example, in order to form the pyramid-shaped engraving portion on the spring tube T, first a pyramid-shaped engraving portion is processed on a mold to manufacture the expandable tube 130, and the pyramid-shaped intaglio engraving portion 130a is formed on the surface of the expandable tube 130 through the engraving portion. Continuously, when the expandable tube 130 presses the spring tube T, the pyramid-shaped engraving portion on the inner surface of the spring tube T is formed in relief, and the relief engraving portion T1 is formed on the outer circumferential surface when the spring tube T is turned inside out after the molding.

As described above, because the intaglio engraving portion 130a is formed on the expandable tube 130, a mold for molding the expandable tube 130 is easy to manufacture, and even though the intaglio engraving portion 130a is stopped during the repeated use, the spring tube melting machine is easy in maintenance because just the expandable tube 130 is replaced.

In the meantime, conventionally, in order to form the relief engraving portion on the outer circumferential surface of the spring tube, intaglio engraving portion must be formed on the inner circumferential surface of the heating core, and hence, it causes an increase of manufacturing costs (for instance, in the case of manufacturing the mold, to form the engraving portion in intaglio requires more processing time and costs than to form the engraving portion in relief), and during the repeated use, the engraving portion on the heating core is easily stopped and damaged, so that the entire of the heating core must be replaced. However, the spring tube melting machine according to the present invention can solve the above problems.

Furthermore, the outer molding part 200 according to the present invention includes: a heating core 210 heated by a heat source 210b while the expandable tube 130 of the inner molding part 100 is accommodated, the heating core 210 having a reference recess 212 corresponding and interlocking with the reference projection 122; and a joining key recess 220 formed at an entrance of the heating core 210 in the form of "⌐" shape in correspondence with the joining key 114.

The heating core 210 is heated by the heat source 210b including a heat wire and steam, and it is preferable that steam is used as the heat source 210b in order to rapidly perform the high-temperature compression molding work.

Here, the heating core 210 has the reference recess 212 formed at the center of the inner bottom surface, and the reference recess 212 has the same sectional form as the reference projection 122 and interlocks the reference projection 122 when the upper plate 110 is assembled, so that the expandable tube 130 and the heating core 210 are located at the same axis.

Moreover, the heating core 210 is locked to or released from the upper plate 110 through the joining key recess 220. The joining key recess 220 includes: a vertical recess 220a formed in a cross sectional form of the joining key 114; and a horizontal recess 220b formed in a direction to be perpendicular to the vertical recess 220a and having the same longitudinal section thickness as the joining key 114. That is, as shown in FIG. 3, the vertical recess 220a and the horizontal recess 220b are communicated with each other in the form of "∟" shape to form the joining key recess 220, and hence, when the joining key 114 of the upper plate 110 is inserted and rotated in a vertical direction, the joining key 114 is simply accommodated and locked on the horizontal recess 220a.

Furthermore, the heating core 210 includes an air discharge valley 210a formed on the inner circumferential surface in a longitudinal direction of the spring tube T. As shown in FIG. 1, at least two air discharge valleys 210a are formed on the inner circumferential surface of the heating core 210. When the spring tube T is pressure-molded by expansion of the expandable tube 130, the remaining air between the outer circumferential surface of the spring tube T and the inner circumferential surface of the heating core is rapidly discharged out along the air discharge valleys 210a, so that bad molding of the spring tube T due to the remaining air can be prevented.

The invention claimed is:

1. A spring tube melting machine for an air suspension system comprising:
   an inner molding part having an upper plate, which has an air injection nozzle and a plurality of joining keys formed on the outer circumferential surface of the upper plate, a finish plate detachably mounted and having an end fixed to the lower surface of the upper plate in such a way as to communicate with the air injection nozzle and having a reference projection formed at the other end thereof so that both ends of the finish plate are sealed and fixed, and an expandable tube inserted into a half-finished spring tube; and
   an outer molding part having a heating core, which is heated by a heat source while the expandable tube of the inner molding part is accommodated and has a reference recess corresponding and interlocking with the reference projection, and a joining key recess formed at an entrance of the heating core in the form of "∟" shape in correspondence with the joining key.

2. The spring tube melting machine according to claim 1, wherein the expandable tube has a relief engraving portion formed on the outer circumferential surface thereof, and the spring tube has an intaglio engraving portion formed on the inner circumferential surface during molding, and hence, when the spring tube is turned inside out after completion of molding, the spring tube has the engraving portion formed on the outer circumferential surface.

3. The spring tube melting machine according to claim 1, wherein the expandable tube has a sectional thickness, which is gradually reduced from both edge portions to the central portion so as to have an arch-curved surface on the inner circumferential surface.

4. The spring tube melting machine according to claim 1, wherein the heating core includes an air discharge valley formed on the inner circumferential surface in a longitudinal direction of the spring tube.

* * * * *